(12) United States Patent
Utsumi

(10) Patent No.: US 12,420,658 B2
(45) Date of Patent: Sep. 23, 2025

(54) SERVER

(71) Applicant: TOYOTA JIDOSHA KABUSHIKI KAISHA, Aichi-ken (JP)

(72) Inventor: Atsuko Utsumi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 693 days.

(21) Appl. No.: 17/842,798

(22) Filed: Jun. 17, 2022

(65) Prior Publication Data

US 2023/0021241 A1 Jan. 19, 2023

(30) Foreign Application Priority Data

Jul. 19, 2021 (JP) .................. 2021-118780

(51) Int. Cl.
| | | |
|---|---|---|
| H02J 7/00 | (2006.01) | |
| B60L 53/63 | (2019.01) | |
| B60L 53/64 | (2019.01) | |
| B60L 53/65 | (2019.01) | |
| B60L 53/66 | (2019.01) | |
| B60L 58/12 | (2019.01) | |

(52) U.S. Cl.
CPC ............... *B60L 53/64* (2019.02); *B60L 53/63* (2019.02); *B60L 53/65* (2019.02); *B60L 53/66* (2019.02); *B60L 58/12* (2019.02); *B60L 2240/72* (2013.01); *Y02T 90/167* (2013.01)

(58) Field of Classification Search
CPC ............... B60L 53/63–66; B60L 58/12; B60L 2240/72; Y02T 90/167

USPC ........................................... 320/109; 701/22
See application file for complete search history.

(56) References Cited

U.S. PATENT DOCUMENTS

2020/0097909 A1 3/2020 Todo et al.
2020/0231059 A1* 7/2020 Hishida .................. B60L 50/66

FOREIGN PATENT DOCUMENTS

| JP | 2007-148590 A | 6/2007 |
| JP | 2017112806 A | 6/2017 |
| JP | 2020-047014 A | 3/2020 |
| JP | 2020-112969 A | 7/2020 |

\* cited by examiner

*Primary Examiner* — Zixuan Zhou
(74) *Attorney, Agent, or Firm* — HAUPTMAN HAM, LLP

(57) ABSTRACT

A server according to the disclosure is a server that can communicate with an electrically-driven vehicle. The server demands that the electrically-driven vehicle disclose vehicle information including positional information on the electrically-driven vehicle and a remaining amount of energy in the electrically-driven vehicle upon receiving a request for the feeding of electric power in the event of a disaster, acquires the vehicle information from the electrically-driven vehicle as to which an approval of the demand for disclosure is obtained from a user of the electrically-driven vehicle, instructs the electrically-driven vehicle to be fed with electric power based on the acquired vehicle information, and notifies the user of the end of acquisition of the vehicle information when the request for the feeding of electric power is ended.

9 Claims, 10 Drawing Sheets

SERVER

CROSS-REFERENCE TO RELATED APPLICATION

This application claims priority to Japanese Patent Application No. 2021-118780 filed on Jul. 19, 2021, incorporated herein by reference in its entirety.

BACKGROUND

1. Technical Field

The disclosure relates to a server.

2. Description of Related Art

In Japanese Unexamined Patent Application Publication No. 2017-112806 (JP 2017-112806 A), there is described a disaster electric power feeding system that decides an electric power feeder for each of vehicles based on evacuation center information and vehicle information in the event of a disaster.

SUMMARY

Users who do not always feel like disclosing vehicle information find the disaster electric power feeding system of JP 2017-112806 A difficult to use.

The disclosure has been made to solve such a problem. The disclosure provides a server that can be provided with vehicle information only in the event of an emergency such as a disaster and that is hence available to a larger number of users.

A server according to the disclosure is a server that can communicate with an electrically-driven vehicle. The server demands that the electrically-driven vehicle disclose vehicle information including positional information on the electrically-driven vehicle and a remaining amount of energy in the electrically-driven vehicle upon receiving a request for the feeding of electric power in the event of a disaster, acquires the vehicle information from the electrically-driven vehicle as to which an approval of the demand for disclosure is obtained from a user of the electrically-driven vehicle, instructs the electrically-driven vehicle to be fed with electric power based on the acquired vehicle information, and notifies the user of the end of acquisition of the vehicle information when the request for the feeding of electric power is ended. Owing to this configuration, the server can be provided with vehicle information only in the event of an emergency such as a disaster, and is hence available to a larger number of users.

Besides, the server may be able to communicate with an energy refill station that refills the electrically-driven vehicle with energy needed to feed electric power to the electrically-driven vehicle, acquire station information including positional information on the energy refill station and a remaining amount of energy at the energy refill station, and instructs the electrically-driven vehicle to be refilled with energy based on the acquired station information and the acquired vehicle information. Owing to this configuration, the server can efficiently refill the electrically-driven vehicle with energy.

According to the disclosure, the server can be provided with vehicle information only in the event of an emergency such as a disaster, and is hence available to a larger number of users.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The disclosure will be described hereinafter through the embodiments of the disclosure. However, the disclosure according to each of the claims is not limited to the following embodiments. Besides, all the configurations described in the embodiments may not always be indispensable as a means for solving the problem. For the sake of clear explanation, the following description and drawings are omitted and simplified as appropriate. In each of the drawings, like elements are denoted by like reference symbols, and redundant description is omitted as needed.

First Embodiment

A server according to the first embodiment will be described. The server of the present embodiment is a server for coping with a request for the feeding of electric power from a municipality or the like in the event of an emergency such as a disaster. In the event of a disaster, it is necessary to make an arrangement for vehicles that are fed with electric power, based on the request for the feeding of electric power from the municipality or the like. It should be noted, however, that the remaining amount of energy such as hydrogen or electricity accumulated in some of the vehicles or the positions of some of the vehicles cannot be grasped in a timely manner. In consequence, the vehicles to be fed with electric power are managed and witnessed artificially.

The server of the present embodiment acquires vehicle information on each of the vehicles that respond to a request for the feeding of electric power from a municipality or the like, and instructs each of the vehicles to be fed with electric power, in the event of an emergency such as a disaster. Thus, it is possible to grasp where each of the vehicles is and how much energy remains in each of the vehicles in the event of a disaster, and, for example, determine timings for feeding electric power or replace the vehicles in a timely manner.

The following description will be given based on an example in which each of the vehicles is an electrically-driven vehicle. The electrically-driven vehicle uses electric power of a battery as all or part of motive power of the vehicle. Examples of the electrically-driven vehicle include an electric vehicle (which will be referred to as an EV), a plug-in hybrid electric vehicle (which will be referred to as a PHEV), a plug-in hybrid vehicle (which will be referred to as a PHV), a hybrid electric vehicle (which will be referred to as an HEV), a hybrid vehicle (which will be referred to as an HV), a fuel-cell electric vehicle (which will be referred to as an FCEV), and a fuel-cell vehicle (which will be referred to as an FCV). Although the following description will be given citing electrically-driven vehicles as an example, the electrically-driven vehicles may be replaced with vehicles such as gasoline vehicles and diesel vehicles as long as these vehicles can be fed with electric power.

Figure 1:
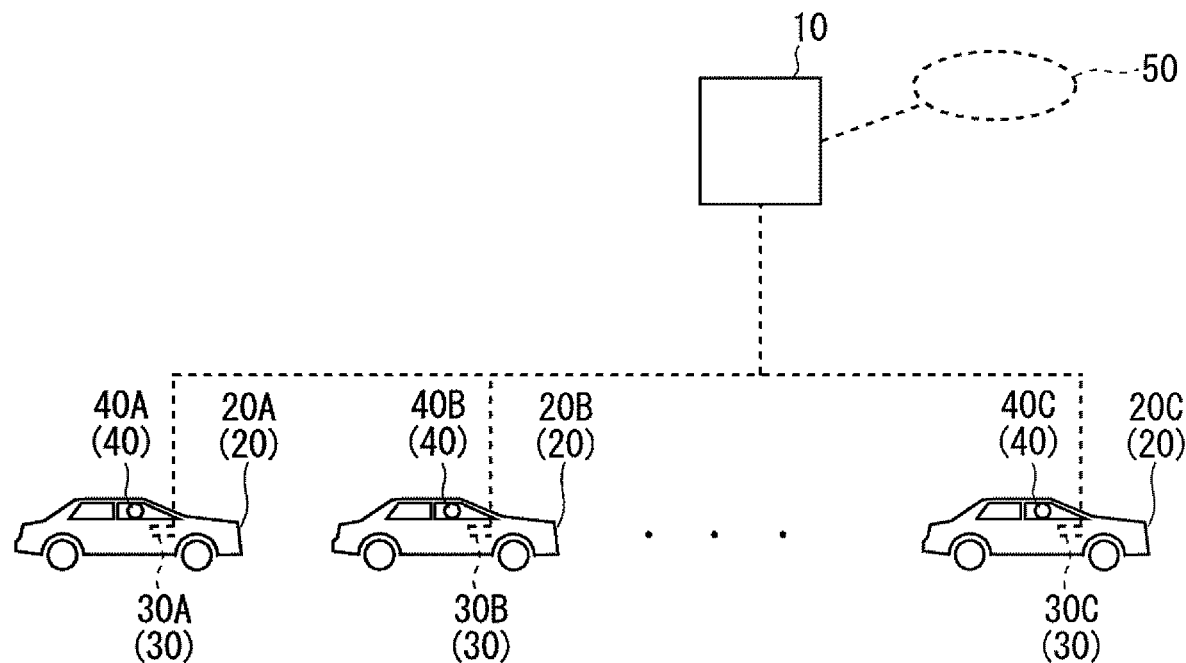
FIG. 1 is a view exemplifying a server and electrically-driven vehicles according to the first embodiment.

FIG. 1 is a view exemplifying a server and electrically-driven vehicles according to the first embodiment. As shown in FIG. 1, a server 10 is connected to electrically-driven vehicles 20A to 20C in a communicable state. For example, the server 10 may be connected to each of the electrically-driven vehicles 20A to 20C in a directly communicable state by a wireless communication line, or may be connected to each of the electrically-driven vehicles 20A to 20C in a communicable state via the Internet. The server 10 may be connected to terminal devices 30A to 30C arranged in the electrically-driven vehicles 20A to 20C respectively, in a communicable state. The electrically-driven vehicles 20A to 20C will be referred to comprehensively as electrically-driven vehicles 20. The terminal devices 30A to 30C will be referred to comprehensively as terminal devices 30. Besides, respective users 40A to 40C of the electrically-driven vehicles 20A to 20C will be referred to comprehensively as users 40.

The server 10 may be connected to a plurality of electrically-driven vehicles 20 or only a single electrically-driven vehicle 20. Although the three electrically-driven vehicles 20A to 20C are depicted in FIG. 1, the number of electrically-driven vehicles 20 may be two or four. The server 10 may not necessarily be fixed at a predetermined place, but may be provided on a cloud platform. The server 10 is connected to, for example, a municipality 50 in a communicable state. The server 10 then receives a request for the feeding of electric power in the event of a disaster from the municipality 50. Incidentally, the server 10 may be arranged in the municipality 50, and receive a request for the feeding of electric power from a department in the municipality 50 that makes the request for the feeding of electric power.

Figure 2:
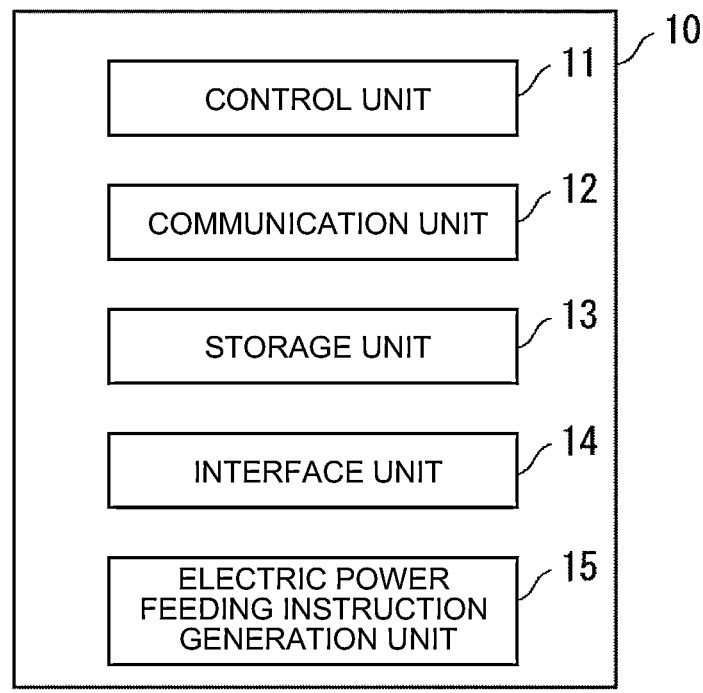
FIG. 2 is a block diagram exemplifying the server according to the first embodiment.

FIG. 2 is a block diagram exemplifying the server 10 according to the first embodiment. As shown in FIG. 2, the server 10 has a control unit 11, a communication unit 12, a storage unit 13, an interface unit 14, and an electric power feeding instruction generation unit 15. The control unit 11, the communication unit 12, the storage unit 13, the interface unit 14, and the electric power feeding instruction generation unit 15 function as control means, communication means, storage means, interface means, and electric power feeding instruction generation means respectively.

The server 10 is an information processing device including a computer, and may include an artificial intelligence (AI). The control unit 11 includes, for example, a processor such as a central processing unit (CPU). The control unit 11 functions as an arithmetic device that performs control processing, arithmetic processing, and the like. Besides, the control unit 11 controls the behavior of respective components such as the communication unit 12, the storage unit 13, the interface unit 14, and the electric power feeding instruction generation unit 15.

The communication unit 12 performs processing that is needed to communicate with each of the electrically-driven vehicles 20 and the municipality 50 via a wireless communication line. The communication unit 12 may be connected to a portable terminal of each of the users 40 via a wireless communication line. The communication unit 12 can include a communication port, a router, a firewall, and the like.

The storage unit 13 may have, for example, a storage device such as a memory or a hard disk. The storage device is, for example, a read-only memory (ROM), a random access memory (RAM), or the like. The storage unit 13 has the function of storing a control program, an arithmetic program, and the like that are executed by the control unit 11. Besides, the storage unit 13 has the function of temporarily storing processed data and the like.

Besides, the storage unit 13 may store personal information such as addresses and phone numbers of the respective users 40. The storage unit 13 may store vehicle identification information such as vehicle types, model codes, and production dates of the respective electrically-driven vehicles 20. The storage unit 13 stores electric power feeding places where the electrically-driven vehicles 20 can be fed with electric power.

The interface unit 14 is, for example, a user interface. The interface unit 14 has an input device such as a keyboard, a touch panel, or a mouse, and an output device such as a display or a speaker. The interface unit 14 accepts an operation of inputting data by an operator or the like, and outputs information to the operator or the like.

The electric power feeding instruction generation unit 15 generates electric power feeding instructions to be transmitted to each of the electrically-driven vehicles 20, based on vehicle information. The control unit 11, the communication unit 12, the storage unit 13, the interface unit 14, and the electric power feeding instruction generation unit 15 are connected to one another via a data bus or the like.

Each of the components of the server 10 can be realized by, for example, executing a program through the control performed by the control unit 11. In more concrete terms, each of the components can be realized through execution of the program stored in the storage unit 13 by the control unit 11. Besides, each of the components may be realized by recording a required program in any non-volatile recording medium and installing the program as needed. Besides, each of the components may not necessarily be realized by a piece of software based on a program, but may be realized through a combination of at least two of a piece of hardware, a piece of firmware, and a piece of software, or the like.

For example, upon receiving a request for the feeding of electric power in the event of a disaster from the municipality 50, the server 10 demands that each of the electrically-driven vehicles 20 disclose vehicle information. In concrete terms, the control unit 11 causes the communication unit 12 to transmit a demand for disclosure of vehicle information to the electrically-driven vehicle 20 when the communication unit 12 receives the request for the feeding of electric power in the event of the disaster from the municipality 50, by controlling the communication unit 12.

After demanding that the electrically-driven vehicle 20 disclose vehicle information, the server 10 receives an approval of disclosure of vehicle information from the user 40 of the electrically-driven vehicle 20. In concrete terms, the control unit 11 causes the communication unit 12 to receive the approval of disclosure of vehicle information from the user 40, by controlling the communication unit 12. Besides, the server 10 may receive a disapproval of disclosure of vehicle information, or may receive neither an approval nor a disapproval of disclosure of vehicle information. The server 10 acquires vehicle information from the electrically-driven vehicle 20 as to which an approval from the user 40 of the electrically-driven vehicle 20 is obtained. In concrete terms, the control unit 11 causes the communication unit 12 to acquire vehicle information from the electrically-driven vehicle 20 as to which an approval from the user 40 is obtained, by controlling the communication unit 12. The vehicle information includes, for example, positional information on the electrically-driven vehicle 20, identification information on the electrically-driven vehicle 20, and a remaining amount of energy in the electrically-driven vehicle 20.

The server 10 instructs the electrically-driven vehicle 20 to be fed with electric power, based on the acquired vehicle information. In concrete terms, the control unit 11 causes the electric power feeding instruction generation unit 15 to generate electric power feeding instructions to be transmitted to the electrically-driven vehicle 20, based on the acquired vehicle information, by controlling the electric power feeding instruction generation unit 15. For example, the electric power feeding instruction generation unit 15 acquires vehicle information including positional information on a position close to an A district of the municipality 50 and a sufficient remaining amount of energy from the electrically-driven vehicle 20 as to which an approval from the user 40 is obtained. In this case, the electric power feeding instruction generation unit 15 generates electric power feeding instructions for instructing the electrically-driven vehicle 20 to move to the A district so as to be fed with electric power at an electric power feeding place in the A district. The control unit 11 then causes the communication unit 12 to transmit the electric power feeding instructions generated by the electric power feeding instruction generation unit 15 to the electrically-driven vehicle 20, by controlling the communication unit 12.

When the request for the feeding of electric power from the municipality 50 is ended, the server 10 notifies the user 40 of the end of acquisition of vehicle information. In concrete terms, the control unit 11 causes the communication unit 12 to transmit the end of acquisition of vehicle information to the user 40 of the electrically-driven vehicle 20 when the communication unit 12 receives the end of the request for the feeding of electric power from the municipality 50, by controlling the communication unit 12. In this manner, the server 10 acquires vehicle information on the electrically-driven vehicle 20 that responds to a request for the feeding of electric power, and instructs the electrically-driven vehicle 20 to be fed with electric power, in the event of an emergency such as a disaster.

The electrically-driven vehicle 20 may have the terminal device 30 connected to the server 10 in a communicable state. The terminal device 30 receives a demand for disclosure of vehicle information from the server 10 in the event of a disaster or the like. Upon obtaining an approval from the user 40 of the electrically-driven vehicle 20, the terminal device 30 transmits the vehicle information acquired from the electrically-driven vehicle 20 to the server 10. Besides, the terminal device 30 receives electric power feeding instructions from the server 10. The terminal device 30 then receives the end of acquisition of vehicle information from the server 10.

Figure 3:
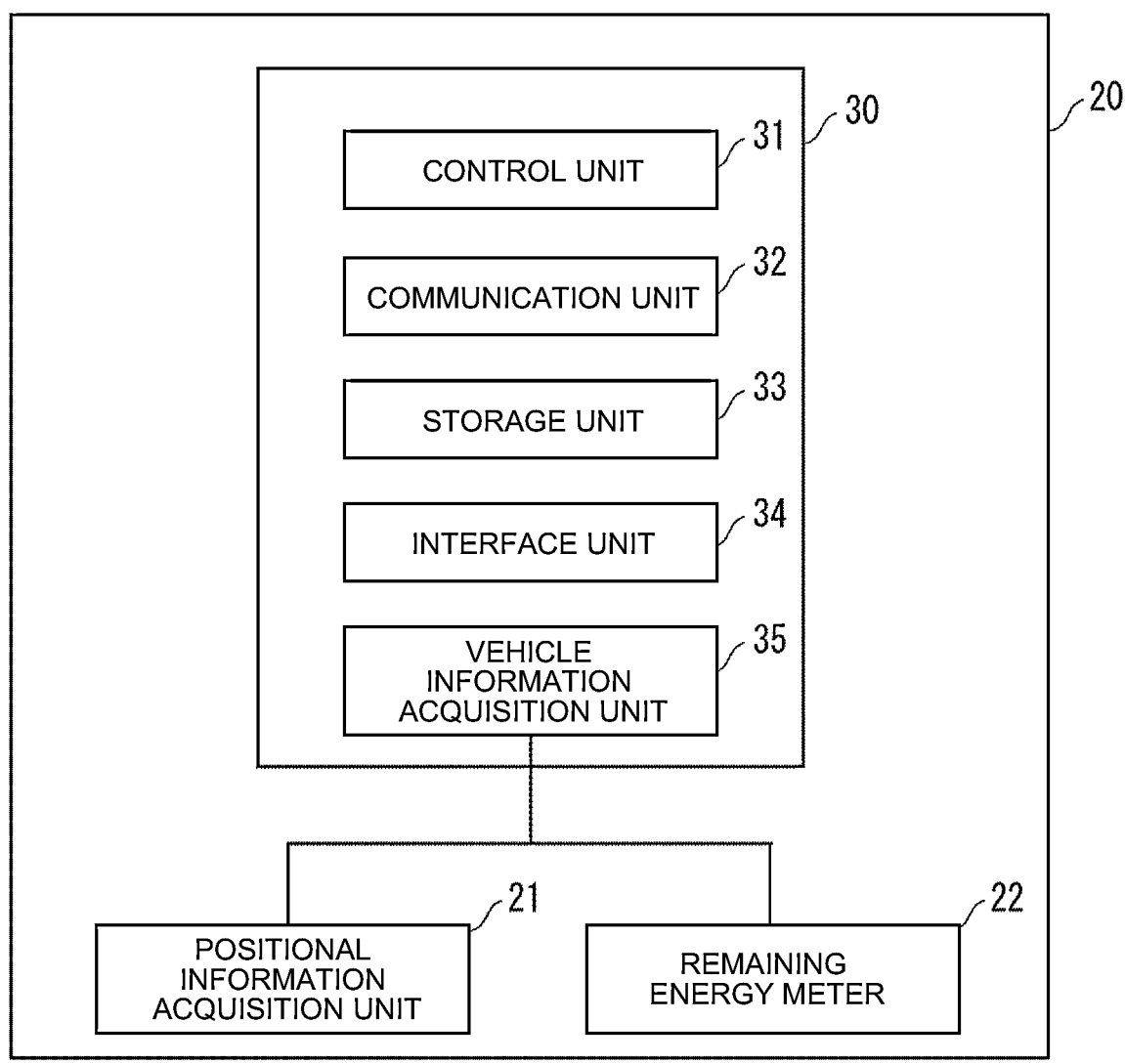
FIG. 3 is a block diagram exemplifying a terminal device according to the first embodiment.

FIG. 3 is a block diagram exemplifying the terminal device 30 according to the first embodiment. As shown in FIG. 3, the terminal device 30 is provided in the electrically-driven vehicle 20. The terminal device 30 is equipped with a control unit 31, a communication unit 32, a storage unit 33, an interface unit 34, and a vehicle information acquisition unit 35. The control unit 31, the communication unit 32, the storage unit 33, the interface unit 34, and the vehicle information acquisition unit 35 function as control means, communication means, storage means, interface means, and vehicle information acquisition means respectively.

The respective components of the terminal device 30 may be arranged in a single housing or on a single substrate, or one or some of the components may be separated from the other components or the other component. For example, the respective components of the terminal device 30 may be arranged in a portable terminal carried by the user 40, may be arranged in a car navigation device arranged in the electrically-driven vehicle 20, or may be arranged in an operational panel or the like of the electrically-driven vehicle 20. Besides, for example, the control unit 31, the storage unit 33, and the vehicle information acquisition unit 35 may be arranged in the car navigation device, and the communication unit 32 and the interface unit 34 may be arranged in the portable terminal. It makes no difference where the respective components of the terminal device 30 are arranged.

The terminal device 30 is an information processing device including a computer, and the control unit 31 includes, for example, a processor such as a CPU. The control unit 31 functions as an arithmetic device that performs control processing, arithmetic processing, and the like. The control unit 31 controls the behavior of the respective components such as the communication unit 32, the storage unit 33, the interface unit 34, and the vehicle information acquisition unit 35.

The communication unit 32 performs a process that is needed to communicate with the server 10 via a wireless communication line. The communication unit 32 can include a communication port, a router, a firewall, and the like. The communication unit 32 may be arranged in the portable terminal of the user 40.

The storage unit 33 may have, for example, a storage device such as a memory, a hard disk, or the like. The storage device is, for example, a read-only memory (ROM), a random access memory (RAM), or the like. The storage unit 33 has the function of storing a control program, an arithmetic program, and the like that are executed by the control unit 31. Besides, the storage unit 33 has the function of temporarily storing processed data and the like.

Besides, the storage unit 33 may store vehicle identification information such as the vehicle type, model code, production date, and the like of the electrically-driven vehicle 20. The storage unit 33 may store an electric power feeding place where the electrically-driven vehicle 20 is fed with electric power.

The interface unit 34 is, for example, a user interface. The interface unit 34 has an input device such as a keyboard, a touch panel, or a mouse, and an output device such as a display or a speaker. The interface unit 34 accepts an operation of inputting data by the user 40, and outputs information to the user 40.

The vehicle information acquisition unit 35 acquires vehicle information including positional information on the electrically-driven vehicle 20 and a remaining amount of energy in the electrically-driven vehicle 20. For example, the vehicle information acquisition unit 35 is connected to a positional information acquisition unit 21 and a remaining energy meter 22 via a wired or wireless communication line. The positional information acquisition unit 21 is, for example, a car navigation device, and acquires information on GPS and the like. The vehicle information acquisition unit 35 may acquire vehicle identification information such as the vehicle type, model code, and production date of the electrically-driven vehicle 20 stored in the storage unit 33, as vehicle information.

The control unit 31, the communication unit 32, the storage unit 33, the interface unit 34, and the vehicle information acquisition unit 35 are connected to one another via a data bus, a wireless communication line, or the like.

The respective components of the terminal device 30 can be realized by, for example, executing a program through the control performed by the control unit 31. In more concrete terms, the respective components can be realized through execution of the program stored in the storage unit 33 by the control unit 31. Besides, the respective components may be realized by recording a required program in any non-volatile recording medium and installing the program as needed. Besides, each of the components may not necessarily be realized by a piece of software based on a program, but may be realized through a combination of at least two of a piece of hardware, a piece of firmware, and a piece of software, or the like.

The terminal device 30 receives a demand for disclosure of vehicle information from the server 10 in the event of a disaster. In concrete terms, the control unit 31 causes the communication unit 32 to receive the demand for disclosure of vehicle information from the communication unit 12 of the server 10, by controlling the communication unit 32. The control unit 31 asks the user 40 if the user 40 approves disclosure of vehicle information, when the communication unit 32 receives the demand for disclosure of vehicle information, by controlling the interface unit 34. In response to this, the user 40 inputs an approval or a disapproval to the interface unit 34.

When the approval from the user 40 is obtained, the terminal device 30 transmits vehicle information to the server 10. In concrete terms, when the user 40 inputs the approval of disclosure of vehicle information to the interface unit 34, the control unit 31 causes the vehicle information acquisition unit 35 to acquire vehicle information, by controlling the vehicle information acquisition unit 35. The control unit 31 ensures transmission of the vehicle information acquired by the vehicle information acquisition unit 35 to the server 10, by controlling the vehicle information acquisition unit 35 and the communication unit 32.

The terminal device 30 receives electric power feeding instructions from the server 10. In concrete terms, the control unit 31 causes the communication unit 32 to receive electric power feeding instructions from the communication unit 12 of the server 10, by controlling the communication unit 32. When the communication unit 32 receives the electric power feeding instructions, the control unit 31 instructs the user 40 to move the electrically-driven vehicle 20 in accordance with the electric power feeding instructions, by controlling the interface unit 34.

When the request for the feeding of electric power from the municipality 50 is ended, the terminal device 30 receives the end of acquisition of vehicle information from the server 10. In concrete terms, the control unit 31 causes the communication unit 32 to receive the end of acquisition of vehicle information from the communication unit 12 of the server 10, by controlling the communication unit 32. Then, when the communication unit 32 receives the end of acquisition of vehicle information, the control unit 31 notifies the user 40 of the end of acquisition of vehicle information, by controlling the interface unit 34.

Figure 4:
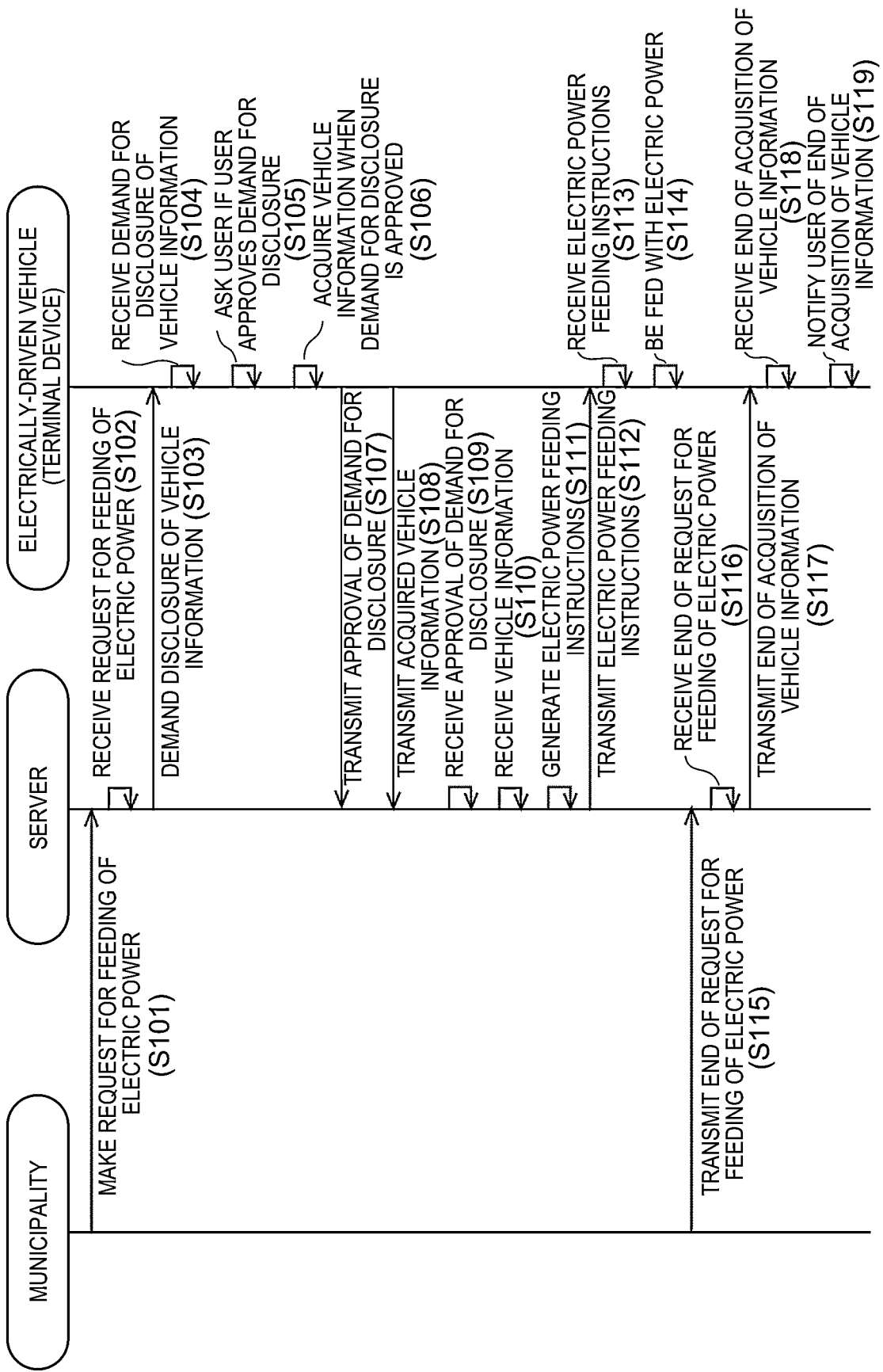
FIG. 4 is a sequence diagram exemplifying an electric power feeding method of the server and the terminal device according to the first embodiment.

Next, an electric power feeding method of the server 10 and the terminal device 30 will be described with reference to a sequence diagram. FIG. 4 is a sequence diagram exemplifying the electric power feeding method of the server 10 and the terminal device 30 according to the first embodiment.

As shown in FIG. 4, the municipality 50 makes a request for the feeding of electric power to the server 10 in the event of a disaster or the like (S101). The server 10 receives the request for the feeding of electric power from the municipality 50 (S102). The server 10 then demands that each of the electrically-driven vehicles 20 disclose vehicle information (S103). Thus, the electrically-driven vehicle 20 receives the demand for disclosure of vehicle information (S104). The electrically-driven vehicle 20 then asks the user 40 if the user 40 approves or disapproves the demand for disclosure (S105). When the user 40 approves the demand for disclosure, the electrically-driven vehicle 20 acquires vehicle information (S106). The electrically-driven vehicle 20 then transmits the approval of the demand for disclosure to the server 10 (S107), and transmits the acquired vehicle information to the server 10 (S108). Thus, the server 10 receives the approval of the demand for disclosure (S109), and receives the vehicle information (S110). Incidentally, when the user 40 disapproves the demand for disclosure or can express neither an approval nor a disapproval due to the non-arrival of the demand for disclosure, the process is ended.

The server 10 generates electric power feeding instructions based on the acquired vehicle information (S111). The electric power feeding instructions may include, for example, an electric power feeding place and a time and a date for feeding electric power. The server 10 then transmits the electric power feeding instructions to the electrically-driven vehicle 20 (S112). The electrically-driven vehicle 20 receives the electric power feeding instructions from the server 10 (S113). The electrically-driven vehicle 20 is then fed with electric power in accordance with the electric power feeding instructions (S114).

When it becomes unnecessary to feed electric power because the emergency such as the disaster has been overcome, the municipality 50 transmits the end of the request for the feeding of electric power to the server 10 (S115). Thus, the server 10 receives the end of the request for the feeding of electric power from the municipality 50 (S116). The server 10 then transmits the end of acquisition of vehicle information to the electrically-driven vehicle 20 (S117). Thus, the electrically-driven vehicle 20 receives the end of acquisition of vehicle information from the server 10 (S118). The electrically-driven vehicle 20 then notifies the user 40 of the end of acquisition of vehicle information (S119).

Figure 5:
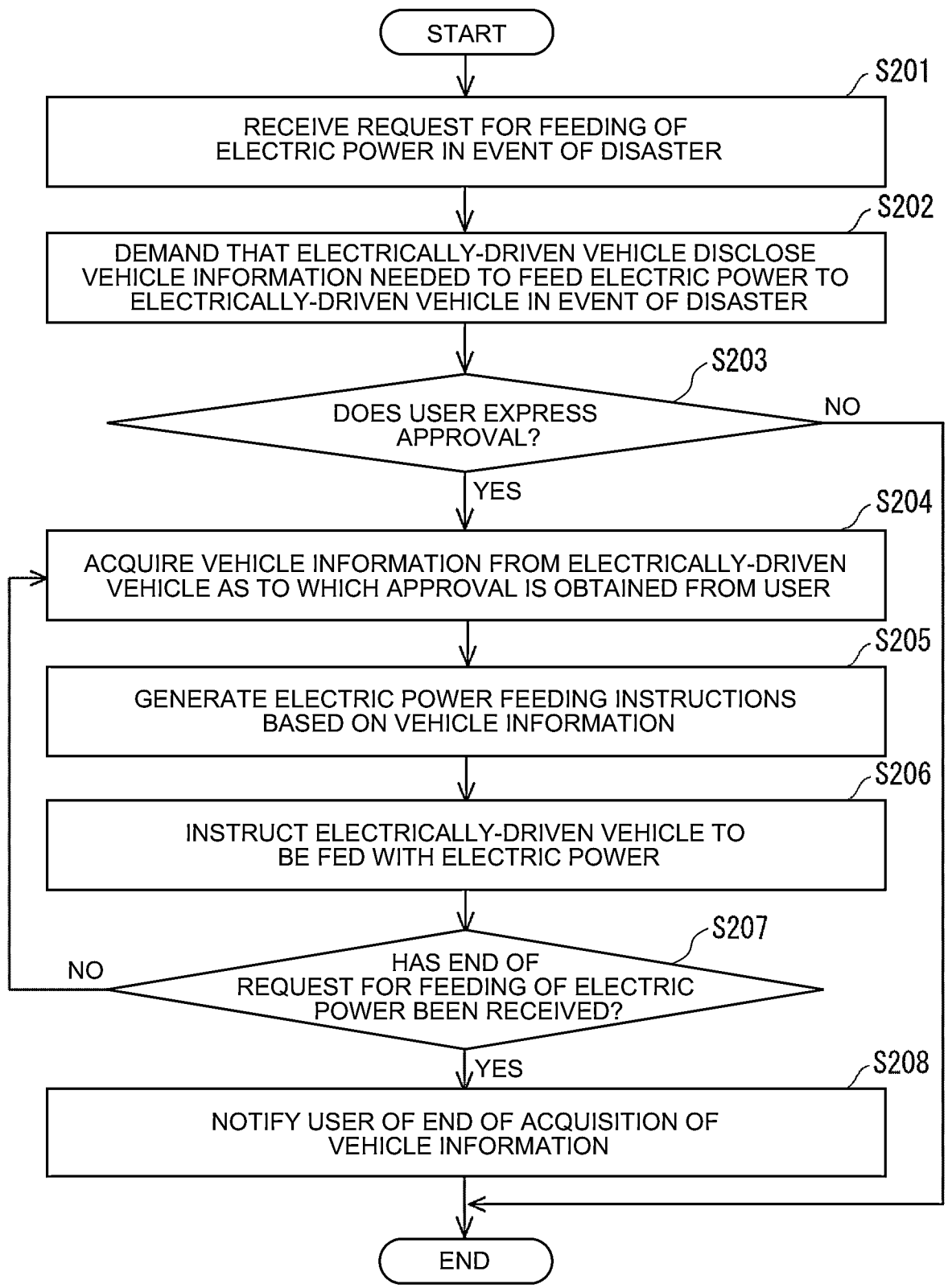
FIG. 5 is a flowchart exemplifying the electric power feeding method in the server according to the first embodiment.

Next, an electric power feeding method in the server 10 will be described using a flowchart. FIG. 5 is a flowchart exemplifying the electric power feeding method in the server 10 according to the first embodiment.

As indicated in step S201 of FIG. 5, the server 10 receives a request for the feeding of electric power in the event of a disaster. For example, the server 10 receives the request for the feeding of electric power in the event of the disaster from the municipality 50. Subsequently, as indicated in step S202, the server 10 demands that each of the electrically-driven vehicles 20 disclose vehicle information that is needed to feed electric power thereto in the event of the disaster. In this case, the electrically-driven vehicle 20 asks the user 40 if the user 40 approves the disclosure of vehicle information.

Subsequently, as indicated in step S203, the server 10 determines whether or not an approval of the disclosure of vehicle information is obtained from the user 40. If no approval is obtained from the user 40 in step S203, the process is ended. On the other hand, if an approval is obtained from the user 40 in step S203, the server 10 acquires vehicle information from the electrically-driven vehicle 20 as to which the approval from the user 40 is obtained, as indicated in step S204.

Subsequently, as indicated in step S205, the server 10 generates electric power feeding instructions based on the acquired vehicle information. In concrete terms, the server 10 generates electric power feeding instructions to be transmitted to the electrically-driven vehicle 20, based on the acquired vehicle information including positional information on the electrically-driven vehicle 20 and a remaining amount of energy in the electrically-driven vehicle 20. Then, as indicated in step S206, the server 10 instructs the electrically-driven vehicle 20 to be fed with electric power, by transmitting the generated electric power feeding instructions to the electrically-driven vehicle 20.

Subsequently, as indicated in step S207, the server 10 determines whether or not the end of the request for the feeding of electric power has been received. If the end of the request for the feeding of electric power has not been received in step S207, the server 10 returns to step S204 to repeat steps S204 to S206. For example, the server 10 may instruct the electrically-driven vehicle 20 to move to another electric power feeding place or to be replaced with another electrically-driven vehicle 20, based on new vehicle information.

On the other hand, if the end of the request for the feeding of electric power has been received in step S207, the server 10 notifies the user 40 of the end of acquisition of vehicle information, as shown in S208. The server 10 then ends the process. In this manner, the server 10 can acquire vehicle information on the electrically-driven vehicle 20 responding to a request for the feeding of electric power, and instruct the electrically-driven vehicle 20 to be fed with electric power, in the event of an emergency such as a disaster.

Figure 6:
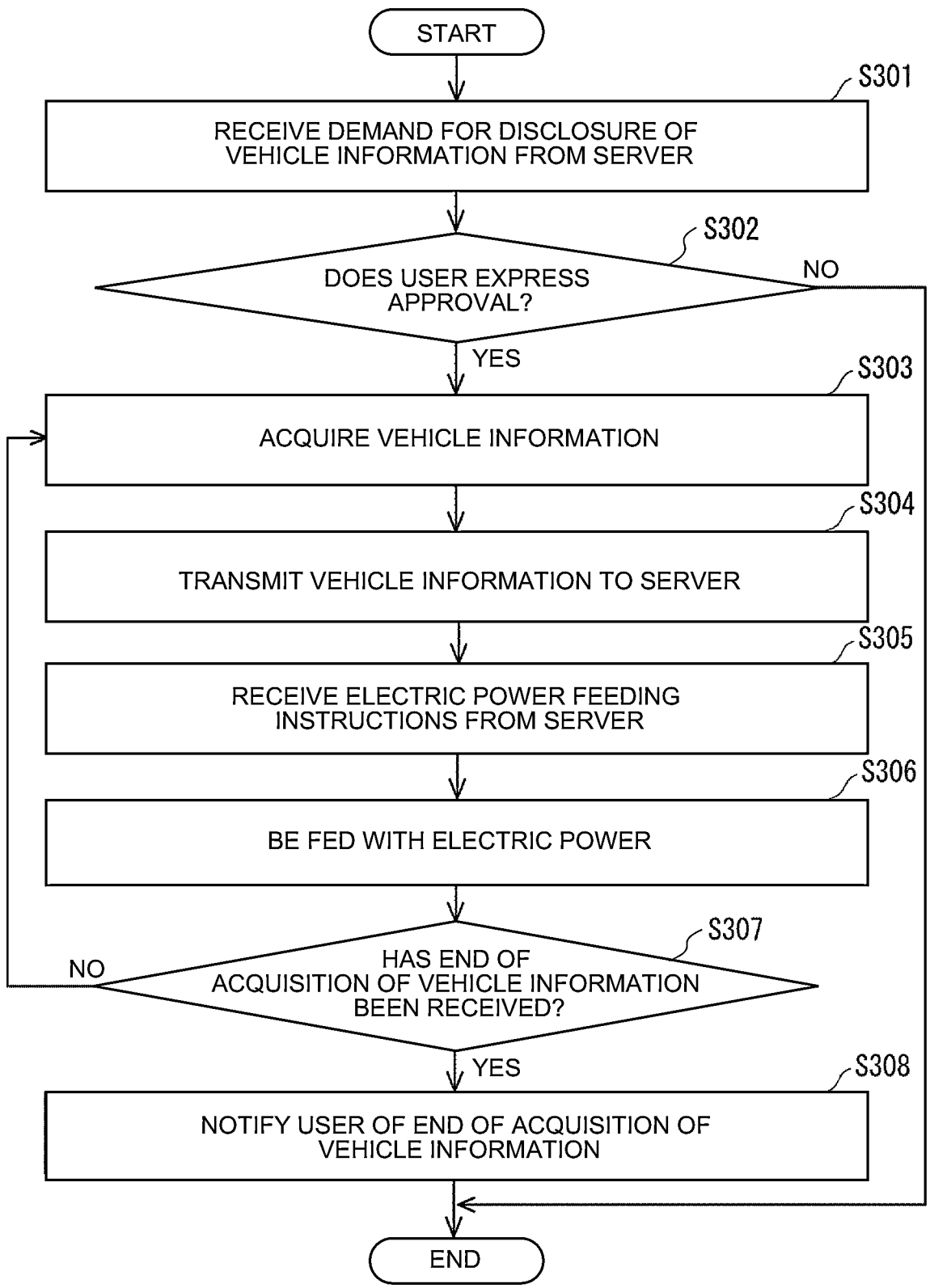
FIG. 6 is a flowchart exemplifying the electric power feeding method in each of the electrically-driven vehicles according to the first embodiment.

Next, an electric power feeding method in each of the electrically-driven vehicles 20 will be described using a flowchart. FIG. 6 is a flowchart exemplifying the electric power feeding method in the electrically-driven vehicle 20 according to the first embodiment.

As indicated in step S301 of FIG. 6, the electrically-driven vehicle 20 receives a demand for disclosure of vehicle information from the server 10. Subsequently, as indicated in step S302, the electrically-driven vehicle 20 asks the user 40 if the user 40 approves the demand for disclosure of vehicle information. If no approval is obtained from the user 40 in step S302, the process is ended. On the other hand, if an approval is obtained from the user 40 in step S302, the electrically-driven vehicle 20 acquires vehicle information as indicated in step S303.

Subsequently, as indicated in step S304, the electrically-driven vehicle 20 transmits the acquired vehicle information to the server 10. Subsequently, as indicated in step S305, the electrically-driven vehicle 20 receives electric power feeding instructions generated by the server 10, based on the transmitted vehicle information. Subsequently, as indicated in step S306, the electrically-driven vehicle 20 is fed with electric power in accordance with the electric power feeding instructions.

Subsequently, as indicated in step S307, it is determined whether or not the end of acquisition of vehicle information has been received from the server 10. If the end of acquisition of vehicle information has not been received from the server 10 in step S307, a return to step S303 is made to repeat steps S303 to S306. For example, new electric power feeding instructions may be received to newly feed the electrically-driven vehicle 20 with electric power, by transmitting new vehicle information. If the end of acquisition of vehicle information has been received from the server 10 in step S307, the electrically-driven vehicle 20 notifies the user 40 of the end of acquisition of vehicle information, as indicated in step S308. The process is then ended. In this manner, the electrically-driven vehicle 20 can be fed with electric power in accordance with the request for the feeding of electric power in the event of an emergency such as a disaster.

Figure 7:
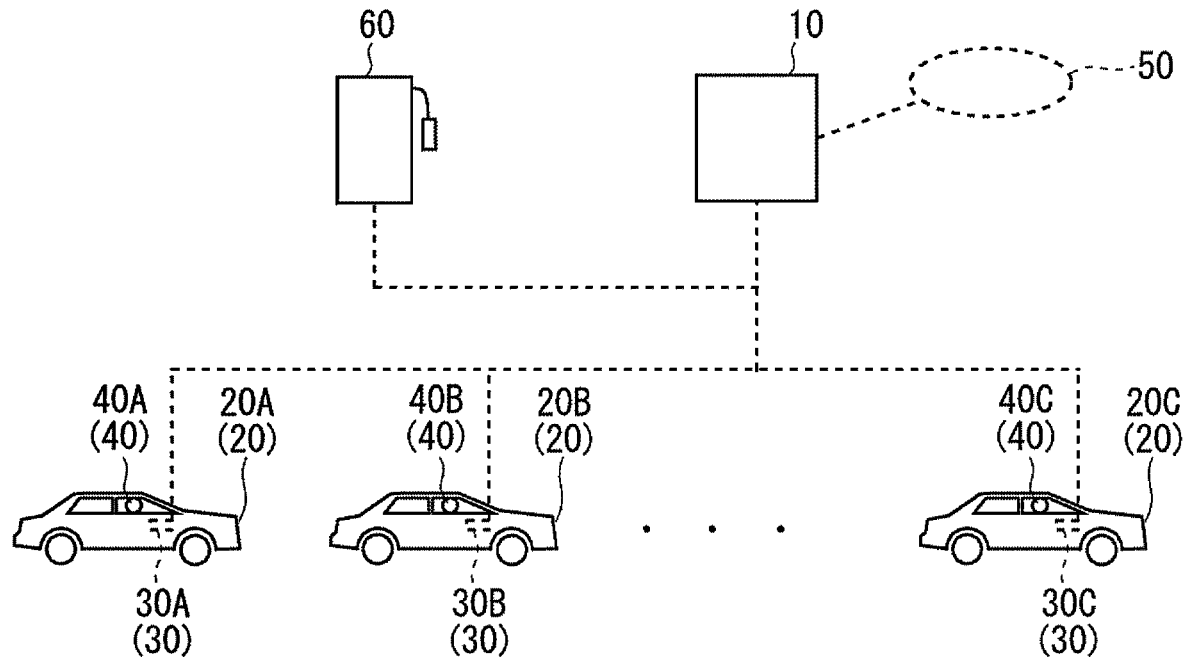
FIG. 7 is a view exemplifying the server and the electrically-driven vehicles to which an energy refill station according to the first embodiment is added.

FIG. 7 is a view exemplifying a server and electrically-driven vehicles to which an energy refill station according to the first embodiment is added. As shown in FIG. 7, the server 10 may be connected to an energy refill station 60 in a communicable state. The energy refill station 60 refills each of the electrically-driven vehicles 20 with energy that is needed to feed the electrically-driven vehicle 20 with electric power, as is the case with, for example, a hydrogen station that refills FCV's with hydrogen. The server 10 acquires station information including positional information on the energy refill station 60 and a remaining amount of energy in the energy refill station 60. The server 10 may instruct the electrically-driven vehicle 20 to be refilled with energy, based on the acquired station information and vehicle information on the electrically-driven vehicle 20.

Next, the effects of the present embodiment will be described. The server 10 of the present embodiment acquires vehicle information on the electrically-driven vehicle 20 that can respond to a request for the feeding of electric power in the event of an emergency such as a disaster. In some cases, the user 40 of the electrically-driven vehicle 20 does not hesitate to provide vehicle information in the event of an emergency, but feels reluctant to provide vehicle information in normal times. Thus, upon receiving the request for the feeding of electric power in the event of a disaster, the server 10 demands that the electrically-driven vehicle 20 disclose vehicle information. The server 10 then acquires vehicle information from the electrically-driven vehicle 20 as to which an approval from the user 40 of the electrically-driven vehicle 20 is obtained. Thus, the server 10 can be provided with vehicle information only in the event of an emergency such as a disaster, and is hence available to a larger number of users 40.

Besides, the server 10 notifies the user 40 of the end of acquisition of vehicle information when the request for the feeding of electric power is ended. Thus, the user 40 does not provide vehicle information in normal times, and can hence feel secure in using the electrically-driven vehicle 20.

When the use of electrically-driven vehicles 20 becomes widespread in the future, there will be a possibility of a large number of electrically-driven vehicles 20 being fed with electric power. For example, even under chaotic circumstances, for example, in the event of a disaster, each of the electrically-driven vehicles 20 can be guided to an optimal place while dispelling worries about a lack of electric power or hydrogen in each of the electrically-driven vehicles 20.

Besides, the electrically-driven vehicle 20 that is thus fed with electric power can be used for a variety of purposes, for example, as a kitchen car, a merchandising vehicle, a medical vehicle as well as a means of transportation, in normal times. In consequence, the electrically-driven vehicle 20 is not prepared for use only in the event of an emergency, but can serve as a multi-purpose vehicle, so a cost reduction can be achieved.

Besides, the electrically-driven vehicle 20 can suppress the occurrence of vibrations, noise, and unusual odor, and can hence improve the environmental hygiene around the electrically-driven vehicle 20.

Second Embodiment

Next, a server according to the second embodiment will be described. The server of the present embodiment is designed to cope with services in which the price of energy fluctuates in accordance with the supply of energy and the demand for energy. In concrete terms, the server of the present embodiment allows electrically-driven vehicles to be refilled with energy in a period of time when the prince of energy is low and in a district where the price of energy is low, even when the price of energy fluctuates in accordance with the supply of energy and the demand for energy.

Figure 8:
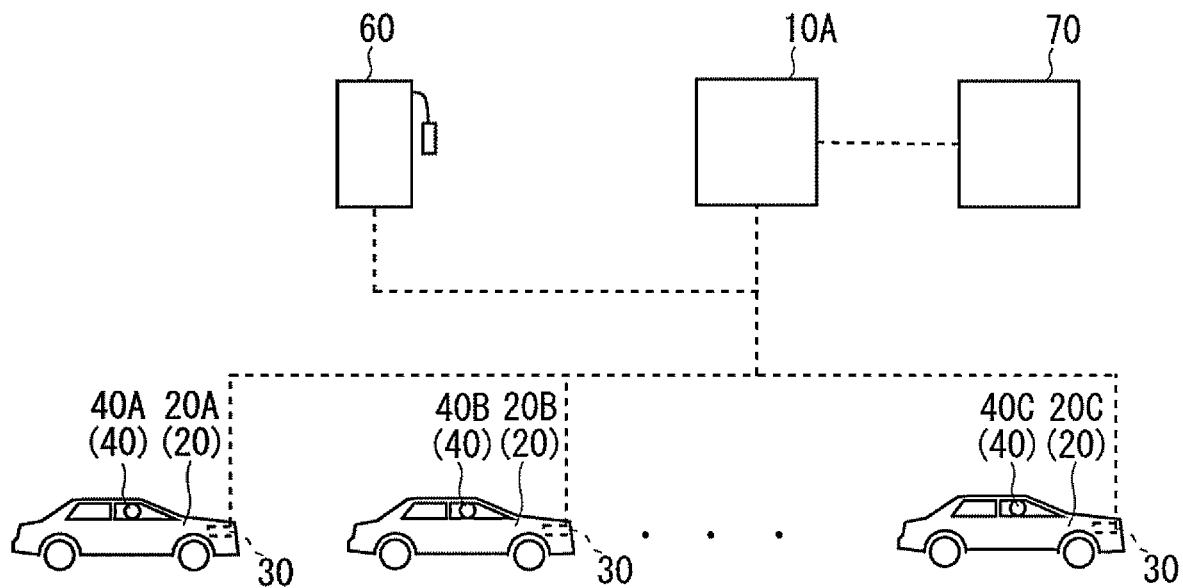
FIG. 8 is a view exemplifying a server, electrically-driven vehicles, and an energy service business operator according to the second embodiment.

FIG. 8 is a view exemplifying a server 10A, the electrically-driven vehicles 20, and an energy service business operator 70 according to the second embodiment. As shown in FIG. 8, the server 10A is connected to the energy service business operator 70 that sells energy, in a communicable state. The energy is, for example, hydrogen with which FCV's are refilled, electric power with which EV's are refilled, or the like. Besides, the server 10A may be connected to the energy refill station 60 in a communicable state. The server 10A receives price information including the price of energy and positional information on districts where energy is sold, from the energy service business operator 70. Besides, the server 10A may be arranged in the premises of the energy service business operator 70, and receive price information from a department that acquires price information in the energy service business operator 70.

Figure 9:
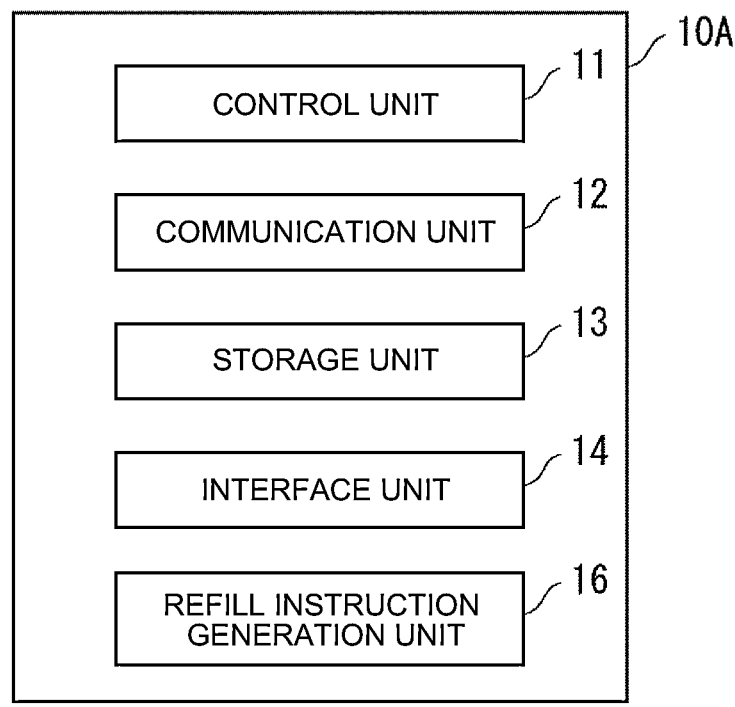
FIG. 9 is a block diagram exemplifying the server according to the second embodiment.

FIG. 9 is a block diagram exemplifying the server 10A according to the second embodiment. As shown in FIG. 9, the server 10A has the control unit 11, the communication unit 12, the storage unit 13, the interface unit 14, and a refill instruction generation unit 16. The control unit 11, the communication unit 12, the storage unit 13, the interface unit 14, and the refill instruction generation unit 16 function as control means, communication means, storage means, interface means, and refill instruction generation means respectively.

The refill instruction generation unit 16 generates refill instructions based on price information including the price of energy and positional information on the districts where energy is sold, and vehicle information. For example, the refill instruction generation unit 16 generates refill instructions to refill the electrically-driven vehicle 20 with energy immediately in a B district, refill the electrically-driven vehicle 20 with energy in a C district from tomorrow, etc., from a difference in prince between the B district and the C district, a difference between a distance from the electrically-driven vehicle 20 to the B district and a distance from the electrically-driven vehicle 20 to the C district, a remaining amount of energy in the electrically-driven vehicle 20, a prediction of fluctuations in the price of energy until a timing when the remaining amount of energy in the electrically-driven vehicle 20 becomes 0, and the like. The other configurational details of the server 10A are identical to those of the first embodiment.

Figure 10:
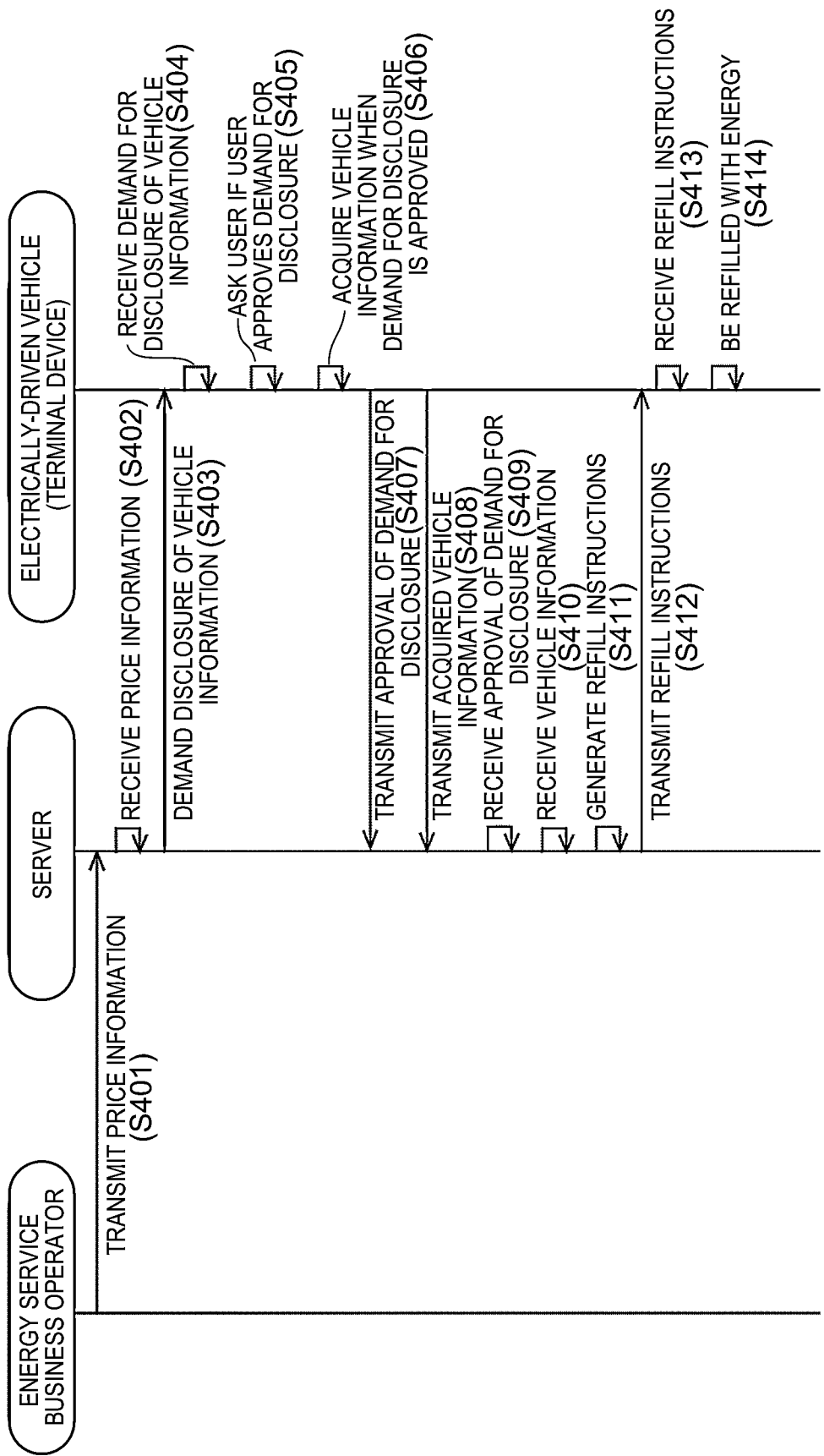
FIG. 10 is a sequence diagram exemplifying an energy refill method in the server and the electrically-driven vehicles according to the second embodiment.

Next, an energy refill method in the server 10A and each of the electrically-driven vehicles 20 will be described with reference to a sequence diagram. FIG. 10 is a sequence diagram exemplifying the energy refill method in the server 10A and the electrically-driven vehicle 20 according to the second embodiment.

As shown in FIG. 10, the energy service business operator 70 transmits, to the server 10A, price information including the price of energy and positional information on districts where energy is sold (S401). The server 10A receives the price information from the energy service business operator 70 (S402). The server 10A then demands that the electrically-driven vehicle 20 disclose vehicle information (S403). Thus, the electrically-driven vehicle 20 receives the demand for disclosure of vehicle information (S404). The electrically-driven vehicle 20 then asks the user 40 if the user 40 approves or disapproves the demand for disclosure (S405). If the user 40 approves the demand for disclosure, the electrically-driven vehicle 20 acquires vehicle information (S406). The electrically-driven vehicle 20 then transmits an approval of the demand for disclosure to the server 10A (S407), and transmits the acquired vehicle information to the server 10A (S408). Thus, the server 10A receives the approval of the demand for disclosure (S409), and receives the vehicle information (S410). Incidentally, if the user 40 disapproves the demand for disclosure or can express neither an approval nor a disapproval due to the non-arrival of the demand for disclosure, the server 10A ends the process.

The server 10A generates refill instructions based on the acquired vehicle information and the acquired price information (S411). The server 10A then transmits the refill instructions to the electrically-driven vehicle 20 (S412). The electrically-driven vehicle 20 receives the refill instructions from the server 10A (S413). The electrically-driven vehicle 20 is refilled with energy in accordance with the refill instructions (S414).

Figure 11:
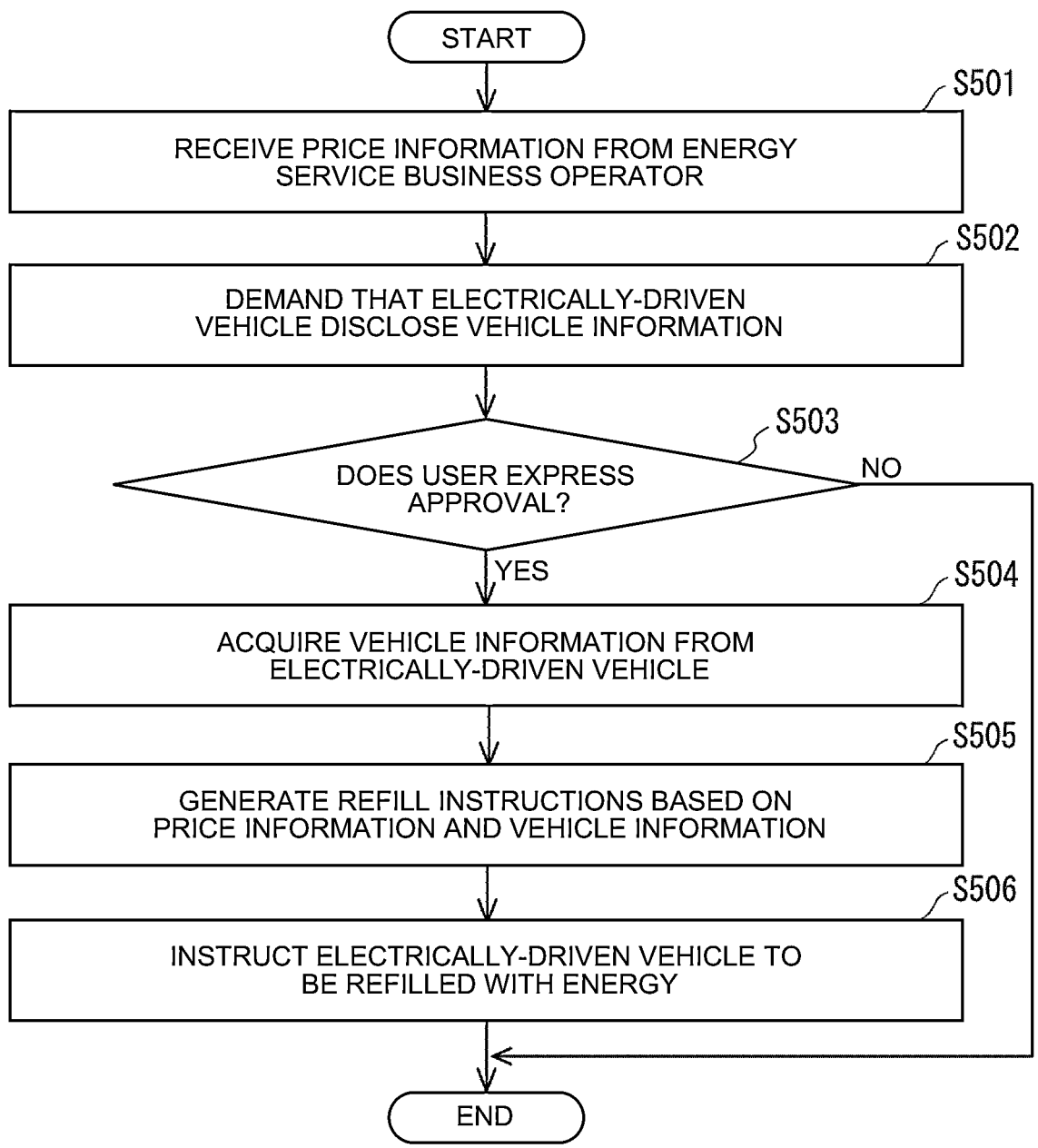
FIG. 11 is a flowchart exemplifying the refill method in the server according to the second embodiment.

Next, a refill method carried out by the server 10A will be described using a flowchart. FIG. 11 is a flowchart exemplifying the refill method in the server 10A according to the second embodiment.

As indicated in step S501 of FIG. 11, the server 10A receives price information from the energy service business operator 70. Subsequently, as indicated in step S502, the server 10A demands that each of the electrically-driven vehicles 20 disclose vehicle information. In this case, the electrically-driven vehicle 20 asks the user 40 if the user 40 approves the disclosure of vehicle information.

Subsequently, as indicated in step S503, the server 10A determines whether or not an approval of the disclosure of vehicle information is obtained from the user 40. If no approval is obtained from the user 40 in step S503, the server 10A ends the process. On the other hand, if an approval is obtained from the user 40 in step S503, the server 10A acquires vehicle information from the electrically-driven vehicle 20 as to which the approval from the user 40 is obtained, as indicated in step S504.

Subsequently, as indicated in step S505, the server 10A generates refill instructions based on price information and vehicle information. In concrete terms, the refill instruction generation unit 16 of the server 10A generates refill instructions to be transmitted to the electrically-driven vehicle 20, based on the price information acquired from the energy service business operator 70 and the vehicle information acquired from the electrically-driven vehicle 20. Then, as indicated in step S506, the server 10A instructs the electrically-driven vehicle 20 to be refilled with energy, by transmitting the generated refill instructions to the electrically-driven vehicle 20.

Figure 12:
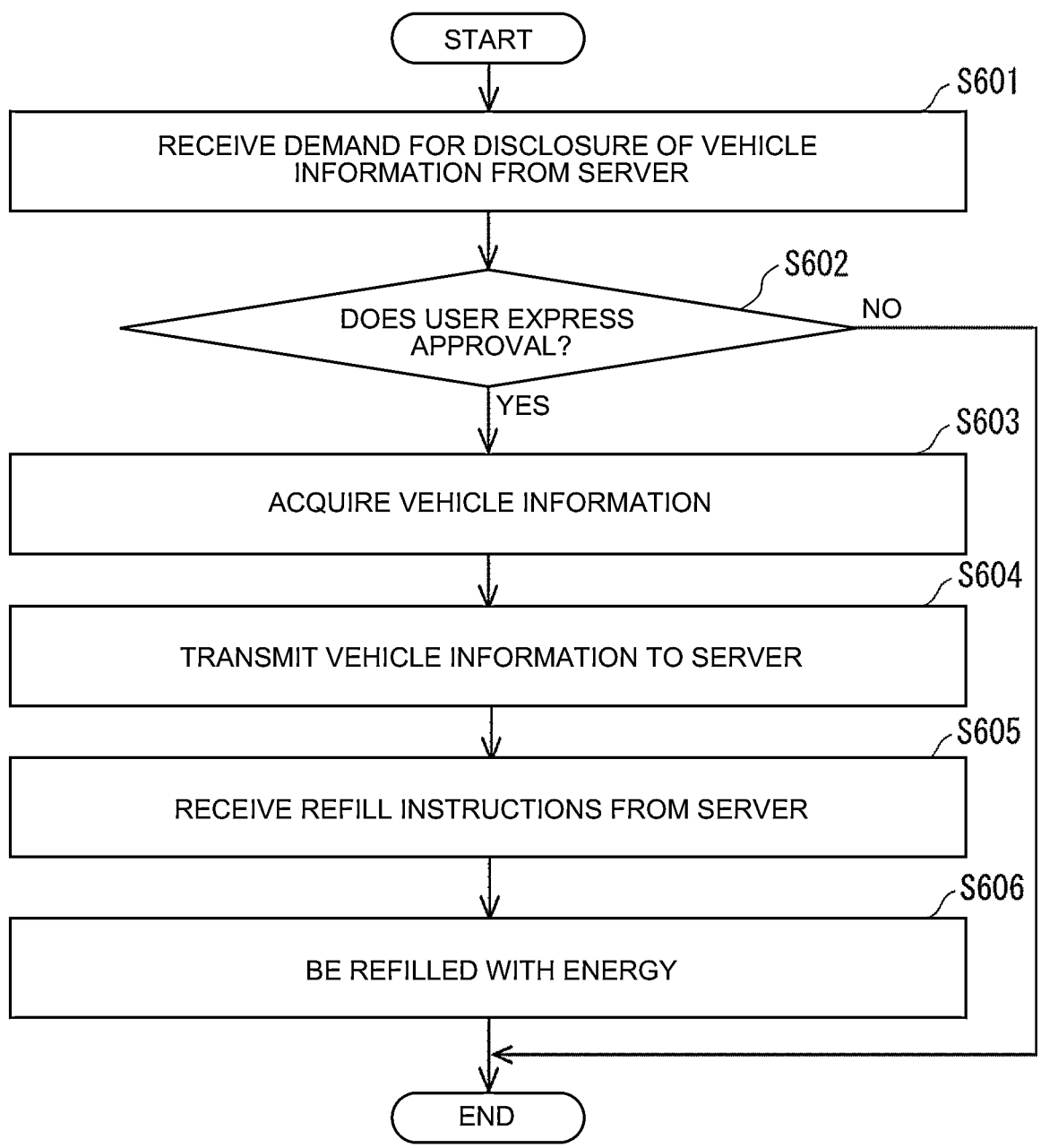
FIG. 12 is a flowchart exemplifying the refill method in each of the electrically-driven vehicles according to the second embodiment.

Next, a refill method in each of the electrically-driven vehicles 20 will be described using a flowchart. FIG. 12 is a flowchart exemplifying the refill method in the electrically-driven vehicle 20 according to the second embodiment.

As indicated in step S601 of FIG. 12, the electrically-driven vehicle 20 receives a demand for disclosure of vehicle information from the server 10A. Subsequently, as indicated in step S602, the electrically-driven vehicle 20 asks the user 40 if the user 40 approves the demand for disclosure of vehicle information. If no approval is obtained from the user 40 in step S602, the process is ended. On the other hand, if an approval from the user 40 is obtained in step S602, the electrically-driven vehicle 20 acquires vehicle information as indicated in step S603.

Subsequently, as indicated in step S604, the electrically-driven vehicle 20 transmits the acquired vehicle information to the server 10A. Subsequently, as indicated in step S605, the electrically-driven vehicle 20 receives refill instructions generated by the server 10A based on price information and the vehicle information from the server 10A. Subsequently, as indicated in step S606, the electrically-driven vehicle 20 is fed with electric power in accordance with the refill instructions. In this manner, the electrically-driven vehicle 20 can be refilled with energy in accordance with the price information.

The server 10A of the present embodiment can cope with services in which the price of energy fluctuates as the supply of energy and the demand for energy fluctuate. In consequence, the server 10A can instruct the user 40 to refill the electrically-driven vehicle 20 with energy in a period of time when the price of energy is low or in a district where the price of energy is low. Thus, the purchase price of energy can be reduced. The configurational details and effects of the present embodiment other than the foregoing are included in the description of the first embodiment.

Incidentally, the disclosure is not limited to the aforementioned embodiments, but can be altered as appropriate within such a range as not to depart from the gist of the disclosure. For example, a combination of the respective configurations of the first and second embodiments also falls within the scope of the technical concept of the disclosure. For example, the disclosure may be designed to cope with services in which the price of energy fluctuates as the supply of energy and the demand for energy fluctuate, in making a request for the feeding of electric power in the event of a disaster.

What is claimed is:

1. A server, comprising a first communication unit to communicate with an electrically-driven vehicle, the electrically-driven vehicle having a terminal device, and the terminal device having a control unit, a second communication unit and an interface unit, wherein
upon receiving a request for feeding of electric power in an event of a disaster, the server causes the first communication unit of the server to send to the electrically-driven vehicle disclose a demand for disclosure of vehicle information including positional information on the electrically-driven vehicle and a remaining amount of energy in the electrically-driven vehicle,
the control unit of the terminal device controls the second communication unit to receive the demand for disclosure of the vehicle information from the first communication unit of the server in the event of a disaster,
when the second communication unit of the terminal device receives the demand for disclosure of the vehicle information, the control unit of the terminal device controls the interface unit to ask a user of the electrically-driven vehicle whether the user approves disclosure of the vehicle information to the server,
when the user's approval of disclosure of the vehicle information is obtained through the interface unit, the control unit of the terminal device controls the second communication unit to transmit the vehicle information to the server,
the server acquires, from the electrically-driven vehicle, the vehicle information for which the approval of disclosure has been obtained from the user of the electrically-driven vehicle,
the server instructs the electrically-driven vehicle to be fed with electric power, based on the acquired vehicle information, and
the server notifies the user of end of acquisition of the vehicle information, when the request for feeding of electric power is ended.

2. The server according to claim 1, wherein
the server communicates with an energy refill station that refills the electrically-driven vehicle with energy needed to feed electric power to the electrically-driven vehicle,
the server acquires, from the energy refill station, station information including positional information on the energy refill station and a remaining amount of energy at the energy refill station, and
the server instructs the electrically-driven vehicle to be refilled with energy, based on the acquired station information and the acquired vehicle information.

3. The server according to claim 2, wherein
in absence of the user's approval of disclosure of the vehicle information, the server does not acquire the vehicle information from the electrically-driven vehicle.

4. The server according to claim 3, wherein
the electric power feeding instructions include an electric power feeding place and a time and a date for feeding electric power.

5. A system, comprising:
an electrically-driven vehicle; and
a server comprising a first communication unit configured to communicate with the electrically-driven vehicle, the electrically-driven vehicle having a terminal device, and the terminal device having a control unit, a second communication unit and an interface unit, wherein
upon receiving a request for feeding of electric power in an event of a disaster, the server is configured to cause the first communication unit of the server to send to the electrically-driven vehicle a demand for disclosure of vehicle information including positional information on the electrically-driven vehicle and a remaining amount of energy in the electrically-driven vehicle,
the control unit of the terminal device is configured to control the second communication unit to receive the demand for disclosure of the vehicle information from the first communication unit of the server in the event of a disaster,
in response to the second communication unit of the terminal device receiving the demand for disclosure of the vehicle information, the control unit of the terminal device is configured to control the interface unit to ask a user of the electrically-driven vehicle whether the user approves disclosure of the vehicle information to the server, in response to the interface unit obtaining the user's approval of disclosure of the vehicle information, the control unit of the terminal device is configured to control the second communication unit to transmit the vehicle information to the server, the server is configured to acquire, from the electrically-driven vehicle, the vehicle information for which the approval of disclosure has been obtained from the user of the electrically-driven vehicle, the server is configured to instruct the electrically-driven vehicle to be fed with electric power, based on the acquired vehicle information, and the server is configured to notify the user of end of acquisition of the vehicle information, in response to the request for feeding of electric power being ended.

6. The system according to claim 5, wherein in response to the interface unit not obtaining the user's approval of disclosure of the vehicle information, the control unit of the terminal device is configured to control the second communication unit to not transmit the vehicle information to the server, and the server does not acquire the vehicle information from the electrically-driven vehicle.

7. The system according to claim 6, wherein the server is configured to communicate with an energy refill station for refilling the electrically-driven vehicle with energy needed to feed electric power to the electrically-driven vehicle, acquire, from the energy refill station, station information including positional information on the energy refill station and a remaining amount of energy at the energy refill station, and instruct the electrically-driven vehicle to be refilled with energy, based on the acquired station information and the acquired vehicle information.

8. The system according to claim 7, wherein the control unit of the terminal device is configured to control the second communication unit of the terminal device to receive electric power feeding instructions from the first communication unit of the server, and in response to the second communication unit of the terminal device receiving the electric power feeding instructions, the control unit of the terminal device is configured to control the interface unit to provide, to the user, instructions to move the electrically-driven vehicle in accordance with the electric power feeding instructions.

9. The system according to claim 8, wherein the electric power feeding instructions include an electric power feeding place and a time and a date for feeding electric power.

* * * * *